United States Patent
Han et al.

(10) Patent No.: US 6,272,622 B1
(45) Date of Patent: Aug. 7, 2001

(54) METHOD OF AND CIRCUIT FOR INSTRUCTION/DATA PREFETCHING USING NON-REFERENCED PREFETCH CACHE

(75) Inventors: Tack-Don Han; Gi-Ho Park, both of Seoul; Shin-Dug Kim, Kyungki-Do, all of (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 829 days.

(21) Appl. No.: 08/522,222

(22) Filed: Sep. 1, 1995

(30) Foreign Application Priority Data

Apr. 11, 1994 (KR) .................................................. 95-8366

(51) Int. Cl.$^7$ ................................ G06F 9/00; G06F 9/44
(52) U.S. Cl. .......................... 712/237; 712/225; 712/226
(58) Field of Search ..................................... 395/584, 580, 395/586, 587, 582; 712/237, 225, 113, 205, 226

(56) References Cited

U.S. PATENT DOCUMENTS

| 4,439,827 | * | 3/1984 | Wilkes | 395/582 |
| 5,261,066 | * | 11/1993 | Jouppi et al. | 395/425 |
| 5,454,117 | * | 9/1995 | Puziol et al. | 395/800 |

FOREIGN PATENT DOCUMENTS

| 0 449 540 A2 | 2/1991 | (EP) . |
| 2 264 577 | 2/1992 | (GB) . |
| 2 264 577 | 1/1993 | (GB) . |

OTHER PUBLICATIONS

Prefetching in supercomputer instruction caches by Smith et al., IEEE publication, pp. 588–597, 1992.*
An intelligent I-cache prefetch mechanism by Young et al., IEEE publication, pp. 44–49, 1993.*
Selective victim caching: a method to improve the performance of direct–mapped caches by Stiliadis, IEEE publication, pp. 412–421, 1994.*
Exposing I/O concurrency with informed prefetching by Patterson et al., IEEE publication, pp. 7–16, 1994.*
"The 17th Annual International Symposium on Computer Architecture", May 28–31, Seattle Washington, IEEE, Inc. pp. 364–373.
"Performance Evaluation of a Processing Element for an On–Chip Multiprocessor", Masafumi Takahashi et al., IEICE Transactions of Electronics, E77–C(1994) Jul., No. 7, Tokyo, Japan, pp. 1092–1099.
"Realizing an L2 as an Extension of an L1", IBM Technical Disclosure Bulletin, vol. 36, No. 12, Dec. 1993, pp. 143–144.

* cited by examiner

Primary Examiner—Zarni Maung

(57) ABSTRACT

A method of and a circuit for instruction/data prefetching using a non-referenced prefetch cache, adapted to store instruction/data blocks prefetched in accordance with a variety of existing prefetchinig machanisms, but not referenced by the central processing unit in an on-chip memory as the non-referenced prefetch cache without discarding them when they are replaced by new ones in a prefetch buffer so that a direct memory reference to the non-referenced prefetch instruction/data blocks can be achieved when they are to be referenced at later times, without any requirement of fetching or prefetching them from the lower memory again. Accordingly, it is possible to not only decrease the number of cache misses and the memory latency due to the fetching of instructions/data from the lower memory for the reference to the instructions/data, but also to reduce memory traffic.

27 Claims, 2 Drawing Sheets

METHOD OF AND CIRCUIT FOR INSTRUCTION/DATA PREFETCHING USING NON-REFERENCED PREFETCH CACHE

BACKGROUND OF THE INVENTION

1. Field of the Invention

The present invention relates to a method of and a circuit for prefetching instructions/data using a non-referenced prefetch (NRP) cache, capable of not only reducing the number of cache misses and decreasing the access latency to the lower memory, but also reducing the memory traffic by storing blocks prefetched from the lower memory, but not referenced by the central processing unit (CPU) in an NRP cache.

2. Description of the Prior Art

Although CPUs are progressing very rapidly in performance, the progression of memories in performance is not as fast as that of such CPUs. Such a performance gap between the CPU and the memory will become more severe as time goes by. Efficiently constructing memory hierarchy is highlighted as an important factor that affects the overall performance of the computer system.

In order to obtain an efficient memory system, most modern computer systems use a cache memory. Basically, such a cache memory is adapted to utilize the locality of reference exhibited when the computer executes a program. During the execution of a program in a computer, the central processing unit (CPU) of the computer references the lower memory. In a certain limited time period, such references are concentrated in some portion of the lower memory. If the CPU references an item, there is a tendency for the items having adjacent addresses to also he referenced. This is referred to as "spatial locality". In case of general programs. several loops are executed which require most of the entire program's execution time. In one loop, the same instructions are repeatedly executed. In particular, it is often the case where the currently referenced instructions will be referenced again shortly thereafter. This is referred to as "temporal locality". The principle of the cache memory is to utilize such reference localities, namely, to store the frequently used blocks of the lower memory in a memory with a very high reference speed interposed between the lower memory and the CPU. Since most of the application programs have both the above-mentioned features, the cache memory can process 90% or more of the entire references to the lower memory by the CPU even when it has a small memory capacity of several kilobytes.

In the use of the cache memory, if an instruction block which the CPU is to reference exists within the cache memory, the CPU readily refers to that block. This status is called "cache hit". On the other hand, the status that the cache memory has no instruction block to be referenced by the CPU is called "cache miss". A hit ratio is used as a measure of the performance of the cache memory. The hit ratio is expressed by the following equation:

$$\text{Hit Ratio} = \frac{\text{Number of Cache Hits}}{\text{Total Number of Memory References}}$$

Meanwhile, cache misses are classified into three kinds, namely, compulsory miss, conflict miss, and capacity miss. The compulsory miss is a cache miss occurring when a block is initially referenced. The conflict miss is a cache miss occurring when a block mapped in the corresponding cache memory location, but subsequently replaced by another block is referenced. On the other hand, the capacity miss is a cache miss occurring when the working set, that is, a set of pages frequently referenced by the CPU in execution of an application program, has a larger capacity than the cache memory.

These kinds of cache misses have different ratios thereof to the entire cache misses as the capacity of the cache memory increases. Although the number of compulsory misses is approximately constant irrespective of a variation in the capacity of the cache memory, numbers of conflict misses and capacity misses tend to decrease as the capacity of the cache memory increases. Since the on-chip cache memory capacity has an increasing trend owing to the development of very large scale integration (VLSI), the portion of compulsory misses over the entire cache misses also tends to increase. Under such circumstances, methods for effectively reducing the number of compulsory misses become more important because most modern computer systems use a large capacity on-chip cache memory.

Of the methods for reducing the number of compulsory misses, the simplest one is to increase the size of a cache block. This is because more instructions are brought into the cache memory on a cache miss and further cache misses caused by sequential access of memory references can be reduced with a larger cache block. However, this approach involves an increase in the CPU cycle taken to fetch a block from the lower memory to the cache memory and an increase in the memory traffic. Moreover, cache pollution may occur due to the large cache block size because the entire block should be replaced on a cache miss even when only a portion of the block is referenced. Such cache pollution results in a degradation in performance. Because the size of a cache block should be selected based oil architectural features such as memory latency and transfer rate, it can not be simply increased only for the purpose of instruction prefetching.

In order to overcome the above-mentioned disadvantages, various prefetching techniques halve been proposed. Prefetchlinig is to fetch a memory block expected to be referenced from the lower memory to the upper memory prior to a reference to the memory block by the CPU. The sequential prefetching is the simplest form of prefetching. In sequential prefetching, the sequential next block of the block currently referenced by the CPU is prefetched. This sequential prefetching technique can provide a great increase in performance for an application program involving a memory reference with a large sequentiality. Generally, the reference to instructions has a large sequentiality as compared to the reference to data. By virtue of such a feature, the sequential prefetching provides a relatively superior performance. Also, the sequential prefetching requires less additional hardware to achieve its prefetch purpose. When the reference to instructions does not follow sequential execution flows, however, no performance improvement is expected by the sequential prefetching. In other words, the sequential prefetching has a disadvantage that the performance gain obtained by the sequential prefetching is not so high when the memory reference is executed along non-sequential execution flows, as in the case of conditional branch instructions or unconditional branch instructions.

Target prefetching is to determine a block to be prefetched by using history information about previous control flows stored in a prediction table. This target prefetching is based on the fact that branch instructions, even if they are conditional branches, tend to follow the previous control flows again in many cases. If a sequential block of a particular block was referenced in previous execution, the sequential block will be prefetched. On the other hand, if a non-sequential block of a particular block was referenced to in previous execution, the non-sequential block will be prefetched. For example, where a block B was referenced after block A in previous execution, the block B will be prefetched upon referencing the block A at later times. Target prefetching has a higher prefetch accuracy thin sequential prefetching because it utilizes the characteristic of branch instructions. However it is difficult to expect a great improvement in performance by the target prefetchinig because branch instructions do not always follow the previous control flows and especially in cases that the memory reference to branch instructions follows sequential and non-sequential control flows in an alternating manner.

A hybrid prefetching is a prefetch method to prefetch both sequential and non-sequential blocks to overcome these shortcomings. But the hybrid prefetching can used in supercomputers which have less memory bandwidth restriction. In the case of microprocessors, the hybrid prefetching has not been considered due to the limited bandwidth. Only a modified form of the hybrid prefetching such as a prefetch method to execute a prefetch on the basis of the priority among blocks to be prefetched can be performed in microprocessor-based systems. The priority among blocks to be prefetched can be determined using information about the previous control flows. This hybrid prefetching is a mechanism modified from existing hybrid prefetch mechanisms. This mechanism will be described in more detail.

Where the memory reference was executed to follow sequential control flows in the previous execution, the sequential next block of the block currently referenced (the sequential next block has a block address corresponding to "the address of the current block +1") is determined as the first one of the candidate blocks to be prefetched. Also, the target block of the current block is determined as the second one of the candidate blocks to be prefetched. On the other hand, where the memory reference was executed to follow non-sequential control flows in the previous execution, the target block of the current block is determined as the first one of the candidate blocks to be prefetched. Also, the sequential next block of the block currently referenced is determined as the second one of the candidate blocks to be prefetched. After determining the first and second candidate blocks to be prefetched, a prefetching operation for the determined candidate blocks is executed. If the first candidate block is not resident in the on-chip memory, it is prefetched from the lower memory to the on-chip memory. After completing this prefetching, the prefetching operation for the candidate blocks is completed. When the first candidate block is resident in the on-chip memory, the second candidate block is prefetched from the lower memory to the on-chip memory if it is not resident in the on-chip memory. On the other hand, when both the first and second candidate blocks are resident in the on-chip memory, no prefetching operation is executed. Thus, the modified hybrid prefetch mechanism can prefetch both the sequential block and the target block in many cases. However, this scheme can not achieve much improvement in performance. Although the improvement in performance achieved by the existing hybrid prefetching technique is not so little, the technique has a disadvantage that it can be implemented only in computer systems that have less restriction on memory bandwidth such as supercomputers.

SUMMARY OF THE INVENTION

Therefore, an object of the invention is to provide a method of and a circuit for instruction/data prefetching using a non-referenced prefetch cache, capable of prefetching both the sequential block and the target block in many cases even in a microprocessor with a limited memory bandwidth by storing blocks prefetched from the lower memory, but not referenced by the CPU in an NRP cache, thereby not only reducing the number of cache misses and decreasing the access latency to the lower memory, but also reducing the memory traffic.

In accordance with one aspect, the present invention provides an instruction/data prefetching method wherein instruction/data blocks prefetched in accordance with an instruction/data prefetch mechanism, but not referenced by a central processing unit are stored in an on-chip memory without being discarded upon replacing them by new ones in a prefetch buffer so that they are to be used for memory reference at later times.

In accordance with another aspect, the present invention provides an instruction/data prefetching circuit comprising: a central processing unit for outputting various control signals required for the execution of a program requiring a memory reference; a lower memory for storing instruction/data blocks required for the execution of the program by the central processing unit; a prefetch control unit for controlling a prefetch of instruction/data blocks to be referenced by the central processing unit; a prefetch buffer for temporarily storing instruction/data blocks prefetched from the lower memory and outputting control signals respectively on the basis of whether the stored instruction/data blocks have been referenced by the central processing unit; a demultiplexor for demultiplexing instruction/data blocks outputted from the prefetch buffer into those referenced by the central processing unit and those not referenced by the central processing unit respectively on the basis of the control signals outputted from the prefetch buffer; a non-referenced prefetch block storing unit for storing those, not referenced by the central processing unit, of the instruction/data blocks outputted from the demutilplexor; and an instruction/data cache for storing the instruction/data blocks outputted from the lower memory, the instruction/data blocks outputted from the demultiplexor and instruction/data blocks outputted from the non-referenced prefetch block storing unit.

Though the present invention explains an instruction prefetching, a data prefetching can also be possible within the spirit and scope of the present invention.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
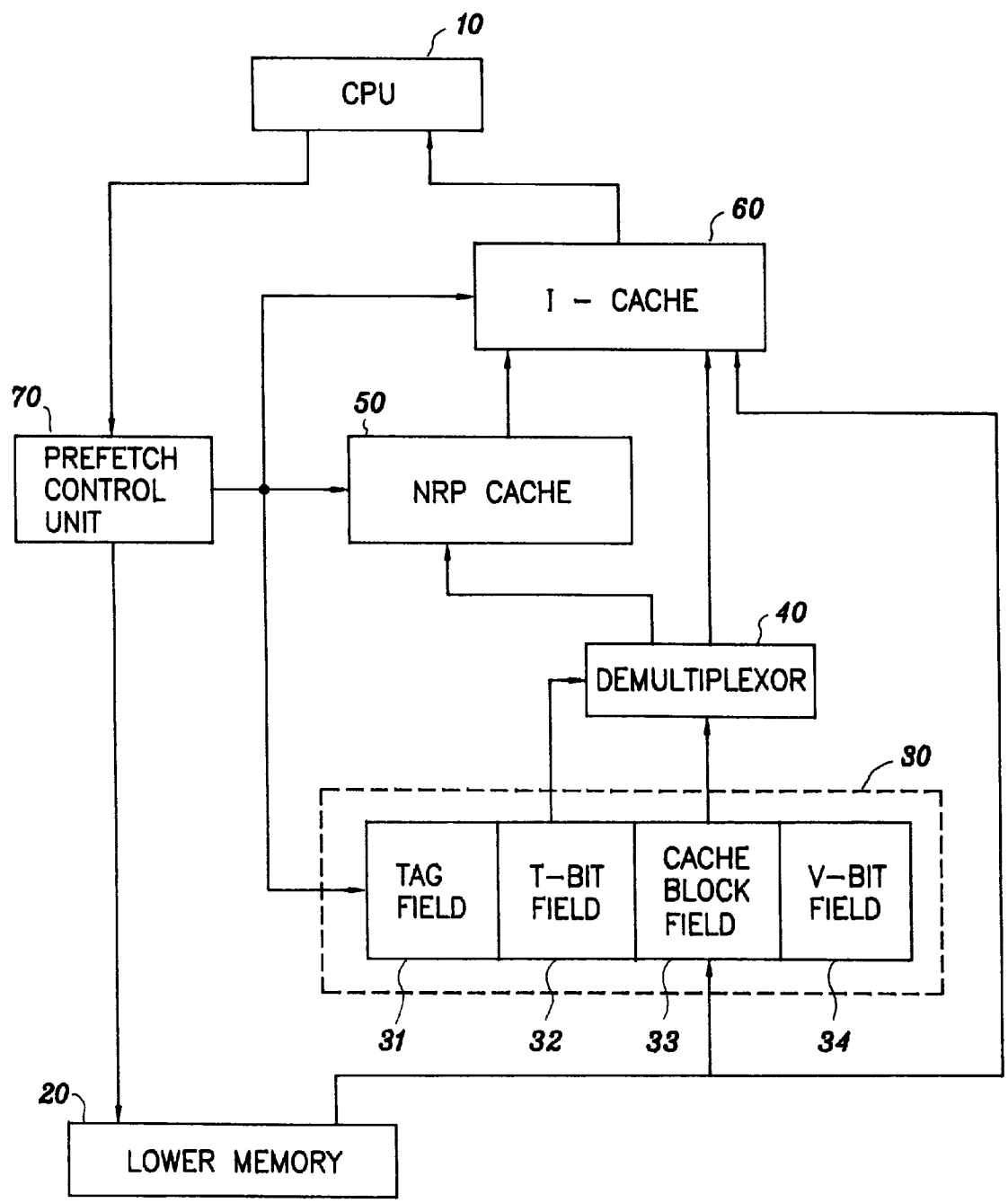
FIG. 1 is a block diagram of an instruction prefetching circuit using a non-referenced prefetch cache in accordance with the present invention.

Referring to FIG. 1, there is illustrated an instruction prefetching circuit using an NRP cache in accordance with the present invention.

As shown in FIG. 1, the instruction prefetching circuit includes a CPU 10 for executing various control operations for a computer to which the instruction prefetching circuit is applied, a lower memory 20 for storing instruction blocks to be referenced by the CPU 10, and a prefetch buffer 30 for temporarily storing blocks prefetched from the lower memory 20. To the prefetch buffer 30, a demultiplexor 40 is coupled which serves to demultiplex blocks outputted from the prefetch buffer 30 respectively on the basis of whether they have been referenced by the CPU 10 or not. The instruction prefetching circuit further includes an NRP cache 50 for storing those, not referenced by the CPU 10, of blocks outputted from the demultiplexor 40, an instruction cache (I-cache) 60 for storing instruction blocks referenced by the CPU 10, and a prefetch control unit 70 for controlling a prefetch operation under a control of the CPU 10.

The prefetch buffer 30, NRP cache 50 and instruction cache 60 correspond to three different on-chip storage locations of an on-chip memory, respectively.

The lower memory 20 serves as a main memory in case that the computer has a memory hierarchy constituted by a single level cache memory system and as a lower-level cache memory or main memory in case the computer has a memory hierarchy constituted by a multi-level cache memory system. Although the instruction prefetching circuit is shown as being constituted by the CPU 10, prefetch buffer 30, NRP cache 50, instruction cache 60 and prefetch control unit 70 all being separated from one another, these constituting elements may be integrated together on a single processor chip.

The prefetch buffer 30 includes a cache block field 33 adapted to store blocks prefetched from the lower memory 20, a tag field 31 adapted to store tags each indicative of the address of each corresponding one of the blocks stored in the cache block field 33, a T-bit field 32 adapted to store T-bits each indicative of whether each corresponding one of the blocks stored in the cache block field 33 has been referenced by the CPU 10 or not, and a V-bit field 34 adapted to store V-bits each indicative of whether the content of each corresponding one of the blocks stored in the cache block field 33 is effective or not.

Figure 2:
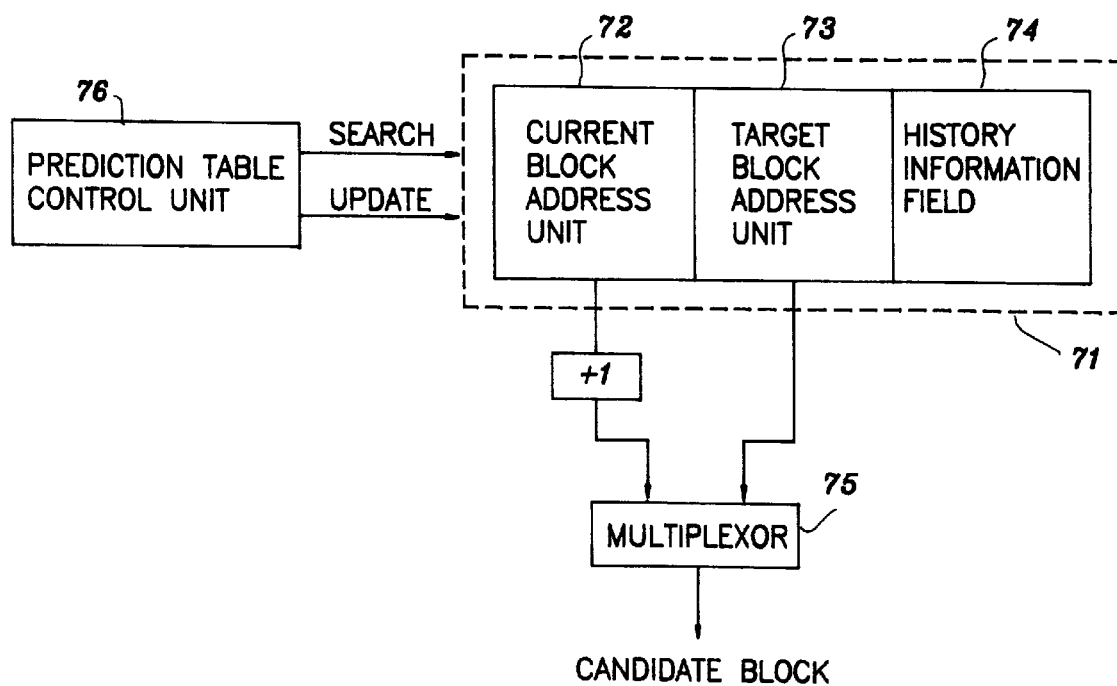
FIG. 2 is a block diagram of a circuit for determining candidate blocks to be prefetched by a prefetch control unit constituting a part of the circuit shown in FIG. 1, wherein the block diagram is to be modified easily even in case of other prefetching mechanisms than the prefetching mechanism of the present invention.

The prefetch control unit 70 serves to determine a candidate block to be prefetched and searches whether the determined candidate block exists in the associated on-chip memory. The prefetch control unit 70 also executes an operation for outputting a prefetch demand instruction to the lower memory 20 when the determined candidate block does not exist in the on-chip memory. As a circuit part for executing the operation to determine candidate blocks to be prefetched, the prefetch control unit 70 includes a prediction table 71, a multiplexor 75 and a prediction table control unit 76, as shown in FIG. 2. Each entry of the prediction table 71 includes a current block address unit 72 adapted to store the address of the block currently referenced by the CPU 10, a target block address unit 73 adapted to the address of the non-sequential block referenced right after the current block in the previous execution, and a history information field 74 adapted to store the information about whether several flows of control, namely, the memory references previously executed are sequential or not. The multiplexor 75 serves to select either the address resulted from the addition of the address outputted from the current block address unit 72 of prediction table 71 by one or the address outputted from the target block address unit 73 on the basis of the information stored in the history information field 74. The prediction table control unit 76 serves to access and update the prediction table 71.

The above-mentioned instruction prefetching circuit using NRP cache and the method carried out using the circuit in accordance with the present invention can be applied to various prefetch techniques. First, the following description will be made in conjunction with the case wherein the present invention is applied to the hybrid prefetch mechanism for prefetching both the sequential block and the target block.

When a program is executed, instruction blocks required for the execution of the program are referenced by the CPU 10. Once a reference to a block A is completed, a new block is referenced by the CPU 10. The newly referenced block may be the sequential block or the non-sequential block in accordance with the program. In the following description, the sequential block and the non-sequential block will be described as the block B and the block C, respectively.

In the case wherein the sequential block B has been referenced right after the block A, updating of the prediction table 71 is executed. For the updating of the prediction table 71, the prediction table control unit 76 searches whether information about the block A exists in the prediction table 71. Where no information about the block A exists in the prediction table 71, the prediction table 71 is not updated. This is because the sequential next block B of the block A is determined by default as the block to be prefetched if a corresponding entry for block A does not exist in the prediction table 71. On the other hand, if information about the block A exists in the prediction table 71, the history information field 74 is set to be sequential.

After completing the updating of the prediction table 71, the prediction table control unit 76 determines candidate blocks to be prefetched. This determination is achieved using the information stored in the prediction table 71 about the block B currently referenced by the CPU 10. If the control flow referenced by the CPU 10 right after the block B in the previous execution is sequential, the sequential block of the block B (the sequential block has the address resulted from the addition of the address of the current block B by one) is determined as the first prefetch candidate block. The target block of the current block B, that is, the block corresponding to the block address stored in the target block address unit 73 of the prediction table entry for the block B is determined as the second prefetch candidate block. If the corresponding prediction table entry for the block B does not exist in the prediction table 71, there is no information for the target block of the block B so that the sequential block of the block B is determined as the only prefetch candidate block. On the other hand, where the control flow referenced by tile CPU 10 right after the block B in the previous execution is non-sequential, the target block of the current block B, that is, the block corresponding to the block address stored in the target block address unit 73 of the prediction table entry corresponding to the block B on the basis of the selection of the multiplexor 75 is determined as the first prefetch candidate block. In this case, the sequential block of the current block B is determined as the second prefetch candidate block.

In the case wherein the non-sequential block C has been referenced by the CPU 10 right after the block A, the prediction table control unit 76 searches whether the information about the block A exists in the prediction table 71, for the updating of the prediction table 71. Where no information about the block A exists in the prediction table 71, the prediction table control unit 76 allocates an entry for the block A in the prediction table 71. Thereafter, the address of the block A is stored in the current block address unit 72 of the prediction table entry. On the other hand, the address of the block C is stored in a prediction table entry of the target block address unit 73 of the prediction table entry. Finally, the history information field 74 of the prediction table entry is set to be non-sequential. However, where information about the block A exists in the prediction table 71, the address of the block C is stored in the target block address unit 73 of the corresponding prediction table entry. In this case, the history information field 74 of the corresponding prediction table entry is set to be non-sequential.

After completing the updating of the prediction table 71, the prediction table control unit 76 determines candidate blocks to be prefetched. This determination is achieved using the information stored in the prediction table 71 about the block C because the block currently referenced by the CPU 10 is the block C. Tile determination of candidate blocks is made on the basis of the information about the block C stored in the history information field 74 of the corresponding prediction table entry, that is, whether the control flow referenced by the CPU 10 right after the block C was sequential or non-sequential, in a manner similar to that executed for the block B.

After completing the updating of the prediction table 71, the prefetch operation is executed. The prefetch is executed first for the first prefetch candidate block. For this prefetch, a search is made about whether the first prefetch candidate block exists in one of the locations of on-chip memory, that is, one of the prefetch buffer 30, NRP cache 50 and instruction cache 60. If the first prefetch candidate block does not exist in any location of the on-chip memory, the prefetch control unit 70 prefetches the first prefetch candidate block from the lower memory 10 and then stores the prefetched block in the prefetch buffer 30. Thus, the prefetch operation is completed. However, if the first prefetch candidate block exists in the on-chip memory, the prefetch control unit 70 tries to execute a prefetch for the second prefetch candidate block in the same manner as mentioned above. Where both the first and second prefetch candidate blocks exist in the on-chip memory, no prefetch is executed.

When the number of blocks prefetched to the prefetch buffer 30 exceeds the capacity of the prefetch buffer 30, the old blocks stored in the prefetch buffer 30 are replaced by blocks newly prefetched from the lower memory 20 in accordance with the block replacement mechanism of the prefetch buffer 30 itself. Meanwhile, the T-bit field 32 of prefetch buffer 30 is the status bit having a set value or a reset value. Each T-bit has the set value when a corresponding block was not referenced by the CPU 10 and has the reset value when the corresponding block was referenced by the CPU 10. Accordinigly, a block referenced by the CPU 10 is simply discarded upon executing the block replacement in the prefetch buffer 30. However, a block not referenced by the CPU 10 is moved to the NRP cache 50 as the corresponding T-bit value from the T-bit field 32 is applied to the demultiplexor 40 as a control signal. In conventional schemes, such prefetched blocks not referenced by the CPU are discarded. Since prefetched blocks not referenced by the CPU are stored in the NRP cache 50 without being discarded in accordance with the present invention, it is possible to achieve a direct reference to the NRP blocks when they are to be referenced by the CPU 10 later times, without any requirement of fetching them from the lower memory 20 again.

The instruction prefetching method using the NRP cache in accordance with the present invention can achieve a superior improvement in performance when it is applied to a scheme based on a combination of the hybrid prefetch mechanism and the lookahead prefetch mechanism. The lookahead prefetching is a prefetch mechanism that prefetches the d-th block which might be expected to be referenced after the current block. The d is called the degree of lookahead prefetching. For example, if the CPU 10 referenced blocks D, E, F subsequently in previous execution, the block F rather than E will be prefetched upon referencing the block D at later times in the lookahead prefetching when the degree of the lookahead prefetching is two.

Where the CPU 10 referenced a sequential block after the current block, for example, the block G in the previous execution in accordance with the lookahead prefetch method, the block I (the address of the current block G+2) will be the block to be prefetched upon referencing, the block G at later times. However, a cache miss may occur in the sequential memory reference if the block H (the address of the current block G +1) does not exist in the on-chip memory. In order to prevent such a cache miss, the block H is determined as the first prefetch candidate block even though the block to be originally prefetched is the block I. In this case, the block I to be originally prefetched is determined as the second prefetch candidate block. The target block of the current block G is determined as the third prefetch candidate block. On the other hand, the block right before the target block is determined as the fourth prefetch candidate block. The block right before the target block has an address resulted from the deduction of one from the address of the target block (the address of the target block −1).

Where the CPU 10 references a non-sequential block after the current block in the previous execution in accordance with the lookahead prefetch method, the target block of the current block is determined as the first prefetch candidate block. As the second prefetch candidate block, the block right before the target block (the address of the target block −1) is determined. This is because the non-sequential case has a lower possibility that the block right before the target block will be referenced prior to the reference of the target block than the sequential case explained above. Also, the block right after the current block (the address of the current block +1) is determined as the third prefetch candidate block. On the other hand, the second block after the current block (the address of the current block +2) is determined as the fourth prefetch candidate block.

After completing the determination of prefetch candidate blocks, prefetching is executed. First, prefetching on the first prefetch candidate block is tried. If the first prefetch candidate block does not exist in the on-chip memory, the candidate block is prefetched from tfle lower memory. Thus, the prefetching is completed. However, if the first prefetch candidate block already exists in the on-chip memory, prefetching on the second prefetch candidate block is then tried. If the second prefetch candidate block does slot exist in the on-chip memory the candidate block is prefetched from the lower memory and thus the prefetching is completed. Where the second prefetch candidate blocks already exists in the on-chip memory, prefetching on the third prefetch candidate block is tried. If the third prefetch candidate block does not exist in the on-chip memory, the candidate block is prefetched from the lower memory and thus the prefetching is completed. Where the third prefetch candidate block already exists in the on-chip memory, prefetching on the fourth prefetch candidate block is tried. If the fourth prefetch candidate block does not exist in the on-chip memory, the candidate block is prefetched from the lower memory and thus the prefetching is completed. On the other hand, if the fourth prefetch candidate block already exists in the on-chip memory, prefetching on the fourth prefetch candidate block is not initiated. In other words, no actual prefetch request is initiated when all the prefetch candidate blocks are already resident in the on-chip memory.

When the number of blocks prefetched to the prefetch buffer 30 exceeds the capacity of the prefetch buffer 30 in the lookahead prefetch scheme to which the present invention is applied, the old blocks stored in the prefetch buffer 30 are replaced by blocks newly prefetched from the lower memory 20 in accordance with the block replacement mechanism of the prefetch buffer 30 itself. Meanwhile, the T-bit field 32 of prefetch buffer 30 is the status bit having a set value or a reset value. Each T-bit has the set value if the corresponding block was not referenced by the CPU 10 and has the reset value if the corresponding block was referenced by the CPU 10. Accordingly, the blocks referenced by the CPU 10 are simply discarded upon executing the block replacement in tlhe prefetch buffer 30. However, the blocks not referenced by the CPU IO are moved to the NRP cache 50 as the corresponding T-bit value from the T-bit field 32 is ipplied to the demultiplexor 40 as a control signal. In conventional schemes, stuclh prefetched blocks not referenced by the CPU are discarded, as mentioned above. Since prefetched blocks not referenced by the CPU are stored in the NRP cache 50 without being discarded in accordance with the present invention, it is possible to achieve a direct reference to the NRP blocks when they are to be referenced by the CPU 10 at later times, without any requirement of fetching them from the lower memory 20 again.

As apparent from the above description, the present invention provides a method of and a circuit for instruction prefetching using an NRP cache, adapted to store instruction blocks prefetched in accordance with a variety of existing prefetching mechanisms, but not referenced by the CPU in an on-chip memory as the NRP cache without discarding them when they are replaced by new ones in a prefetch buffer so that a direct memory reference to the NRP blocks can be achieved when they are to be referenced at later times, without any requirement of fetching them from the lower memory again. Accordingly, it is possible to not only decrease the number of cache misses and the memory latency due to the fetching of instructions from the lower memory for the reference to the instructions, but also to reduce memory traffic.

Although the preferred embodiments of the invention have been disclosed for illustrative purposes, those skilled in the art will appreciate that various modifications, additions, and substitutions are possible, without departing from the scope and spirit of the invention as disclosed in the accompanying claims

What is claimed is:

1. An instruction prefetching method wherein instruction blocks prefetched in accordance with an instruction prefetch mechanism, but not referenced by a central processing unit are stored in an on-chip memory without being discarded upon replacing them by new ones in a prefetch buffer so that they are to be used for memory reference at later times.

2. An instruction prefetching method in accordance with claim 1, wherein the instruction prefetch mechanism is a hybrid prefetch mechanism.

3. An instruction prefetching method in accordance with claim 1, wherein the instruction prefetch mechanism is a lookahead prefetch mechanism.

4. An instruction prefetching method in accordance with claim 1, wherein the instruction prefetch mechanism is a combination of a plurality of instruction prefetch mechanisms.

5. An instruction prefetching method in accordance with claim 1, wherein the on-chip memory is a cache memory.

6. A data prefetching method wherein data blocks prefetched in accordance with a data prefetch mechanism, but not referenced by a central processing unit are stored in an on-chip memory without being discarded upon replacing them by new ones in a prefetch buffer so that they are to be used for memory reference at later times.

7. A data prefetching method in accordance with claim 6, wherein the on-chip memory is a cache memory.

8. An instruction prefetching circuit comprising:

a central processing unit for outputting various control signals required for the execution of a program requiring a memory reference;

a lower memory for storing instruction blocks required for the execution of the program by the central processing unit;

a prefetch control unit for controlling a prefetch of instruction blocks to be referenced by the central processing unit;

a prefetch buffer for temporarily storing instruction blocks prefetched from the lower memory and outputting control signals respectively on the basis of whether the stored instruction blocks have been referenced by the central processing unit;

a demultiplexor for demultiplexing instruction blocks outputted from the prefetch buffer into those referenced by the central processing unit and those not referenced by the central processing unit respectively on the basis of the control signals outputted from the prefetch buffer;

a non-referenced prefetch block storing unit for storing those, not referenced by the central processing unit, of the instruction blocks outputted from the demultiplexor; and an instruction cache for storing the instruction blocks outputted from the lower memory, the instruction blocks outputted from the demultiplexor and instruction blocks outputted from the non-referenced prefetch block storing unit.

9. An instruction prefetchinig circuit in accordance with claim 8, wherein the non-referenced prefetch block storing unit comprises a cache memory.

10. An instruction prefetching circuit in accordance with claim 8, wherein the prefetch buffer comprises:

a cache block field adapted to store each of the instruction blocks prefetched from the lower memory;

a V-bit field adapted to indicate whether the instruction block stored in the cache block field is effective or not;

a tag field adapted to indicate the address of the instruction block stored in the cache block field; and a T-bit field adapted to indicate whether the instruction block stored in the cache block field has been referenced by the central processing unit or not.

11. A data prefetching circuit comprising:

a central processing unit for outputting various control signals required for the execution of a program requiring a memory reference;

a lower memory for storing data blocks required for the execution of the program by the central processing unit;

a prefetch control unit for controlling a prefetch of data blocks to be referenced by the central processing unit;

a prefetch buffer for temporarily storing data blocks prefetched from the lower memory and outputting control signals respectively on the basis of whether the stored data blocks have been referenced by the central processing unit;

a demultiplexor for demultiplexing data blocks outputted from the prefetch buffer into those referenced by the central processing unit and those not referenced by the central processing unit respectively on the basis of the control signals outputted from the prefetch buffer;

a non-referenced prefetch block storing unit for storing those, not referenced by the central processing unit, of the data blocks outputted from the demultiplexor; and a data cache for storing the data blocks outputted from the lower memory, the data blocks outputted from the demultiplexor and data blocks outputted from the non-referenced prefetch block storing unit.

12. A data prefetching circuit in accordance with claim 11, wherein the non-referenced prefetch block storing unit comprises a cache memory.

13. A data prefetching circuit in accordance with claim 11, wherein the prefetch buffer comprises:

a cache block field adapted to store each of the data blocks prefetched from the lower memory;

a V-bit field adapted to indicate whether the data block stored in the cache block field is effective or not;

a tag field adapted to indicate the address of the data block stored in the cache block field; and a T-bit field adapted to indicate whether the data block stored in the cache block field has been referenced by the central processing unit or not.

14. A method of accessing information in a memory or use by a central processing unit (CPU), the method comprising the steps of:

a) storing information accessed from the memory used by the CPU in a first storage device;

b) prefetching information for use by the CPU and storing prefetched information in a second storage device;

c) transferring prefetched information which has been unused by the CPU and storing the unused prefetched information in a third storage device, wherein the unused information stored in the third storage device is accessible by the CPU.

15. The method of claim 14, wherein prefetching step comprises the steps of:

checking information stored in the first, second and third storage devices;

prefetching information which is different from the information stored in the first, second and third storage devices; and storing the different information in the second storage device.

16. The method of claim 14, wherein the prefetching step uses a hybrid prefetching mechanism.

17. The method of claim 14, wherein the prefetching step uses a lookahead prefetching mechanism.

18. The method of claim 14, wherein the second storage device stores the prefetched information, a first field indicating whether the prefetched information is effective, a second field indicating addresses of the prefetched information stored in the second storage device, and a third field indicating whether the information stored in the second memory device has been referenced by the CPU.

19. The method of claim 18, wherein the transferring step comprises demultiplexing prefetched information stored in the second storage device to the third memory based on the third field.

20. The method of claim 14, wherein said first, second and third storage devices are on-chip memories, respectively.

21. The method of claim 14, wherein said first and third memories are cache memories.

22. A circuit for prefetching information stored in a memory device for use by a central processing unit (CPU), comprising:

a first memory that stores information accessed from the memory for use by the CPU;

a second memory that stores prefetched information to be used by the CPU and that stores control information indicative of whether the prefetched information has been accessed by the CPU;

a third memory that stores prefetched information which has been unused by the CPU, wherein the unused information stored in said third storage device is accessible by the CPU;

means, coupled to at least one of said first memory and said second and third memories, for transferring prefetched information unused by the CPU from said second memory to said third memory based on the control information; and a control circuit that controls operations of said first, second and third memories.

23. The circuit of claim 22, wherein said means comprises a demultiplexer.

24. The circuit of claim 22, wherein said second memory includes:

a cache field that stores the prefetched information;

a first field that indicates whether the prefetched information is effective;

a second field that indicates an address of the prefetch information stored in the second storage device; and a third field that indicates whether the information stored in said cache field has been referenced by the CPU.

25. The circuit of claim 22, wherein said control circuit determines a candidate information to be prefetched and determines whether the information exists in said second memory.

26. The circuit of claim 25, wherein said control circuit comprises:

a prediction table used for determining the candidate information;

a control unit for searching and updating the prediction table; and a multiplexer for outputting the candidate information from said prediction table.

27. The circuit of claim 26, wherein said prediction table comprises:

a current information unit that stores an address of the information currently referenced by the CPU;

a target information unit that stores an address of non-sequential information referenced immediately after the current information in a previous execution by the CPU; and a history information field that stores information about whether the information referenced by the CPU is sequential or not.

* * * * *

UNITED STATES PATENT AND TRADEMARK OFFICE
CERTIFICATE OF CORRECTION

PATENT NO. : 6,272,622 B1 Page 1 of 1
DATED : August 7, 2001
INVENTOR(S) : Han et al.

It is certified that error appears in the above-identified patent and that said Letters Patent is hereby corrected as shown below:

<u>Title page,</u>
Please change Item [30] Foreign Application Priority Data as follows, change "Apr. 11, 1994" to -- Apr. 11, 1995 --

Signed and Sealed this

Eleventh Day of June, 2002

Attest:

JAMES E. ROGAN
Attesting Officer    Director of the United States Patent and Trademark Office